(12) United States Patent
Lehnert et al.

(10) Patent No.: US 6,695,317 B2
(45) Date of Patent: Feb. 24, 2004

(54) SEAL

(75) Inventors: Angela Lehnert, Rüti (CH); Remo Höchli, Dürnten (CH); Stefano Fornito, Gossau (CH)

(73) Assignee: Tecan Trading AG, Baar (CH)

( * ) Notice: Subject to any disclaimer, the term of this patent is extended or adjusted under 35 U.S.C. 154(b) by 0 days.

(21) Appl. No.: 09/969,929

(22) Filed: Oct. 3, 2001

(65) Prior Publication Data

US 2002/0185821 A1 Dec. 12, 2002

(30) Foreign Application Priority Data

Jun. 12, 2001 (DE) .......................... 201 09 678

(51) Int. Cl.$^7$ .......................... F02F 5/00; B60T 11/236
(52) U.S. Cl. .......................... 277/436; 277/491
(58) Field of Search ................. 277/458, 491; 73/864.16, 864.17; 422/700; 436/54; 604/218, 221, 222, 228

(56) References Cited

U.S. PATENT DOCUMENTS

| | | | |
|---|---|---|---|
| 2,589,106 A | * | 3/1952 | Marien .................. 277/458 |
| 3,335,643 A | * | 8/1967 | Wentworth .................. 92/182 |
| 3,759,148 A | * | 9/1973 | Geffroy .................. 92/160 |
| 4,106,911 A | * | 8/1978 | Marcelli .................. 141/237 |
| 4,243,233 A | * | 1/1981 | Arai .................. 277/357 |
| 4,541,735 A | * | 9/1985 | Abu-Isa .................. 236/101 R |
| 5,426,988 A | * | 6/1995 | Ohata et al. .................. 384/255 |
| 6,374,683 B1 | * | 4/2002 | Hunicke-Smith et al. .................. 73/864.17 |

* cited by examiner

Primary Examiner—Anthony Knight
Assistant Examiner—Doug Hutton
(74) Attorney, Agent, or Firm—McDonnell Boehnen Hulbert & Berghoff

(57) ABSTRACT

The invention relates to a seal (1) for separating a first chamber (2) from a second chamber (3) in a device (4) for aspirating and/or dispensing fluids (5), wherein the seal (1) is embodied to be ring-shaped and to act on an outer surface (6) of a piston (7), or on an inner surface (8) of a cylinder (9) of this device (4), and wherein the seal can be inserted into an annular groove (10) located in the outer surface (6) of the piston (7), or in the inner surface (8) of the cylinder (9). The seal (1) in accordance with the invention is distinguished in that it comprises a flat contact surface (12) embodied to rest against a flank (11) of the annular groove (10), a support area (13) freely projecting into the first or second chamber (2, 3), and a cylindrical sealing face (14).

17 Claims, 1 Drawing Sheet

SEAL

FIELD OF THE INVENTION

The invention relates to a seal for separating a first chamber from a second chamber in a device for aspirating and/or dispensing fluids, wherein the seal is embodied to be ring-shaped and to act on an outer surface of a piston, or an inner surface of a cylinder of this device, and wherein the seal can be inserted into an annular groove located in the outer surface of the piston, or the inner surface of the cylinder.

The invention further relates to a device for aspirating and/or despensing fluids. This device for aspirating and/or dispensing of fluids, having a first and second chamber, a seal for separating these two chambers and an annular groove for inserting this seal.

BACKGROUND OF THE INVENTION

Automatic devices for aspirating and/or dispensing fluids in laboratories which, for example, are engaged in molecular-biological/biochemical testing, are known as automatic pipette devices, for example. O-ring seals for separating the cylinder (fluid and/or air chamber) from the exterior (atmosphere), whether fastened on the circumference of the piston or on the inner wall of the cylinder, are part of the prior art. One-way syringes, for example, for injecting medicaments, are known as the simplest form of a device for aspirating and/or dispensing fluids. With these syringes, O-rings, or also ring-shaped lip seals, which separate the rear (air) chamber from the front (fluid) chamber, are customarily partially inserted into a groove extending around the piston of the syringe. The same arrangement can also be found in automatic pipette devices with one or several "syringes", which are essentially parallel with each other. However, often a seal is inserted into a groove cut into the inner surface of the cylinders, so that the pistons are moved, but the seals essentially remain stationary.

The friction between the seal and the piston, or between the seal and the cylinder, plays an increasingly important role in automatic pipette devices having a multitude of conduits (for example 8 or 96 conduits), for the parallel charging of the small pots or "wells" in a micro-plate. In connection with the use of medical syringes it is known that the resistance caused by the friction at the seal surface is clearly perceived by the medical personnel. This friction can make the automatic functioning of a multi-pipette head, or multi-pipetting device, questionable. In contrast thereto, lip seals are known as low-friction seals.

The employment of so-called sealing mats for multi-pipette heads, or multi-pipetting devices, is also known. The precision achieved when punching out the holes in which the pistons of the multi-pipette head are later intended to move is so unsatisfactory in multi-pipette heads with, for example, 384 conduits, that it is not possible to sufficiently seal all 384 conduits, because it is often impossible to bring the position of the hole into satisfactory alignment with the position of the piston. Also, additional and expensive finishing of holes which became ragged in the course of punching is often required.

Since the movements of the sealing lip cause unacceptable changes in the cylinder volume, lip seals can make the reproducible reception and/or delivery of small volumes of fluids in the sub-milliliter, or in particular the sub-microliter range, more difficult, or impossible.

OBJECT AND SUMMARY OF THE INVENTION

It is therefore an object of the present invention to propose an alternative seal, which at least partially eliminates the disadvantages found in the prior art.

It is a further object of the present invention to propose a device for aspirating and/or dispensing fluids, having a first and second chamber, an alternative seal for separating these two chambers and an annular groove for inserting this seal.

In respect to the seal, this object is attained by means of the characteristics of independent claim 1, in that a seal for separating a first chamber from a second chamber in a device for aspirating and/or dispensing fluids is proposed, which seal is embodied to be ring-shaped and to act on an outer surface of a piston, or an inner surface of a cylinder of this device, wherein the seal can be inserted into an annular groove located in the outer surface of the piston, or the inner surface of the cylinder. The seal in accordance with the invention is distinguished by comprising a flat contact surface embodied to rest against a flank of the annular groove, a support area freely projecting into the first or second chamber, and a cylindrical sealing face.

In respect to the device, this object is attained by means of the characteristics of independent claim 7, in that a device for aspirating and/or dispensing of fluids, having a first and second chamber, a seal for separating these two chambers and an annular groove for inserting this seal is proposed. The device in accordance with the invention is distinguished by comprising at least one seal in accordance with one of the claims 1 to 6.

Additional characteristics in accordance with the invention ensue from the dependent claims.

If a conventional seal (for example an O-ring) is used for sealing a chamber into which a piston can partially enter, and if this O-ring seals, for example, the outer circumference or outer surface of this piston, the following facts can be noticed: when the piston is moved, the seal is initially deformed until the adhesive friction between the seal and the piston has been overcome. This deformation of the seal causes a volume change in this chamber without the sealing face actually moving. The greater such a volume change is, the greater the resulting error during pipetting. If then the piston is moved over an extended distance, the sealing face can approach its desired position because of the low sliding friction between the seal and the piston and in this way practically compensate the volume error. However, pipetting in the sub-microliter range in particular demands the movement of the piston over very short displacement lengths, which causes the noticeable volume error and the concomitant poor pipetting precision.

Moreover, the volume error is a function of the state of the seal in respect to its mobility, elasticity, the portion of plasticizer in it and its erosion. This state changes over time, so that many different states can occur in multi-pipetting devices, in particular on account of the individual replacement of single seals. This state of the seal affects the friction between the seal and the piston. An undesired scattering of the precision of pipetting of the individual conduits results for all these reasons.

When using sealing mats in multi-pipetting devices it can occur that individual conduits, or perhaps even a single conduit, is not correctly sealed. In such cases it is necessary to exchange the entire sealing mat.

Therefore, among the advantages of the seal in accordance with the invention over the prior art are:

the cylindrical sealing face is supported on both sides in such a way that it is practically fixed in place in respect to the annular groove in which it is seated, and therefore can have no effect on the pipetting volume;

with short displacement lengths of the pipette piston the volume error is negligible;

pipetting in the sub-microliter range is independent of the state of the seal in respect to friction, mobility, elasticity, the portion of plasticizer in it and its erosion;

individual seals can be replaced at any time without the pipetting precision being impaired.

Preferred embodiments of the seal in accordance with the invention will be explained by means of the schematic drawings, without the latter restricting the scope of the invention.

DETAILED DESCRIPTION OF THE PREFERRED EMBODIMENTS

Figure 1:
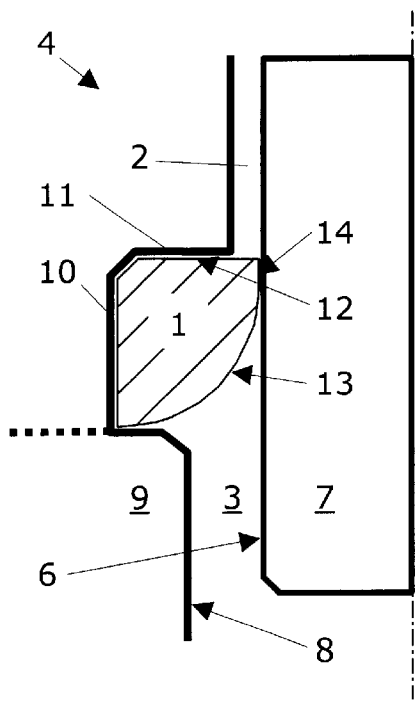
FIG. 1 represents a vertical partial section through a device for aspirating and/or dispensing fluids, having a seal in accordance with a first exemplary embodiment.

FIG. 1 represents a vertical partial section through a device for aspirating and/or dispensing fluids, having a seal in accordance with a first exemplary embodiment. This embodiment resembles a ring-shaped quarter torus. The seal 1 separates a first chamber 2 from a second chamber 3. The chambers 2, 3 are located in a device 4 for aspirating and/or dispensing fluids. The seal 1 is ring-shaped and designed to act on an outer surface 6 of a piston 7 of this device 4.

The seal 1 can be inserted into an annular groove 10 located in the inner surface 8 of the cylinder 9. This annular groove can be cut into a one-piece piston, or cylinder wall. Alternatively, the arrangement of a corresponding depression in a first cylinder element (here separated by the dashed line) can contribute to the generation of such an annular groove 10. This alternative has the particular advantage that the seal 1 in the annular groove 10 is slightly squeezed when fastening the cylinder components to each other, wherein the contact pressure of the sealing face 14 on the piston 7 running on this seal 1 can be regulated and set by means of the amount of the squeezing.

The seal 1 comprises a flat contact surface 12, embodied to rest against a flank 11 of the annular groove 10; a support area 13, freely projecting into the first or second chamber 2,3, depending on the direction in which the seal has been inserted; and a cylindrical sealing face 14 facing the piston 7. The contact surface 12 and the support area 13 support the cylindrical sealing face 14 on both sides, so that for all practical purposes it is immovably seated in regard to the annular groove 10 into which it has been inserted, and therefore can have no effect on the pipetting volume.

This seal in accordance with a first embodiment is suitable for a seal between two chambers of a device 4 for aspirating and/or dispensing fluids, and in particular in case where the two chambers 2,3 are air-filled chambers. An overhead mounting of the seal 1, with the contact surface 12 facing down, is also possible and particularly preferred when the chamber 3 is a fluid-filled chamber.

Figure 2:
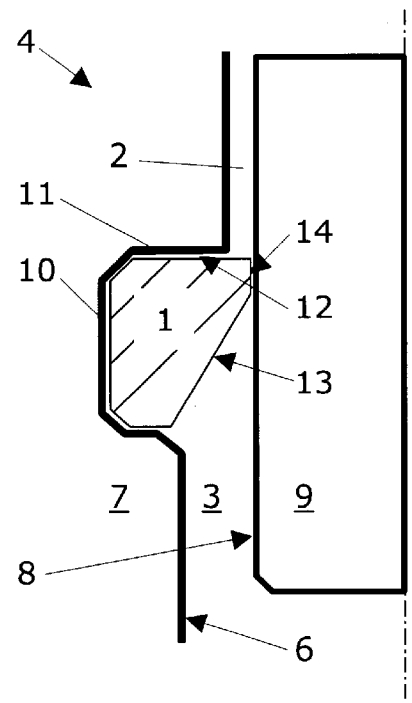
FIG. 2 represents a vertical partial section through a device for aspirating and/or dispensing fluids, having a seal in accordance with a second exemplary embodiment.

FIG. 2 represents a vertical partial section through a device for aspirating and/or dispensing fluids, having a seal in accordance with a second exemplary embodiment. In contrast to FIG. 1, which represents a seal with a "non-linear inner cone", the support area 13 here is designed as a cone surface which linearly narrows against the cylindrical sealing face 14. Also differing from FIG. 1, the seal 1 is here designed for acting on an inner surface 8 of a cylinder 9 of this device 4. In this case the seal 1 can be inserted into an annular groove 10 located on the surface 6 of the piston 7.

This seal in accordance with a second embodiment is also suitable as a seal between two chambers of a device 4 for aspirating and/or dispensing fluids, and particularly in those cases where the two chambers 2,3 are air-filled chambers. An overhead mounting of the seal 1, with the contact surface 12 facing down, is also possible and particularly preferred when the chamber 3 is a fluid-filled chamber.

Figure 3:
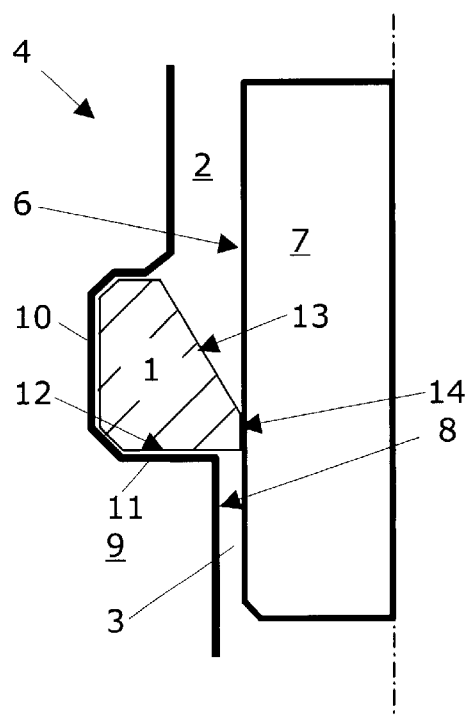
FIG. 3 represents a vertical partial section through a device for aspirating and/or dispensing fluids in accordance with a second exemplary embodiment, having a seal of a second variation installed.

FIG. 3 represents a vertical partial section through a device for aspirating and/or dispensing fluids in accordance with a second exemplary embodiment, having a seal of a second variation (overhead) installed. This type of installation of the seal 1 is therefore also particularly suited as a seal between two chambers of a device 4 for aspirating and/or dispensing fluids, if the chamber 2 is a air-filled chamber and the chamber 3 a fluid-filled chamber. The fluid 5 wets the outer surface 6 of the piston 7 and the inner surface 8 of the cylinder 9. In the course of pulling the piston 7 up, this fluid is stripped off from the edge between the contact surface 12 and the cylindrical sealing face 14 and is not further pulled into the air chamber 2 in the form of a thin film on the piston surface 6, such as can be the case with O-rings.

The drawing figures so far represented are devices 4 for aspirating and/or dispensing fluids, which have a multi-pipette head with a plurality, in particular 96, 384 or 1536, of pistons 7 and cylinders 9, which are essentially arranged parallel next to each other. However, it is also possible for a device 4 for aspirating and/or dispensing fluids to only have a single conduit, such as represented in FIG. 4.

Figure 4:
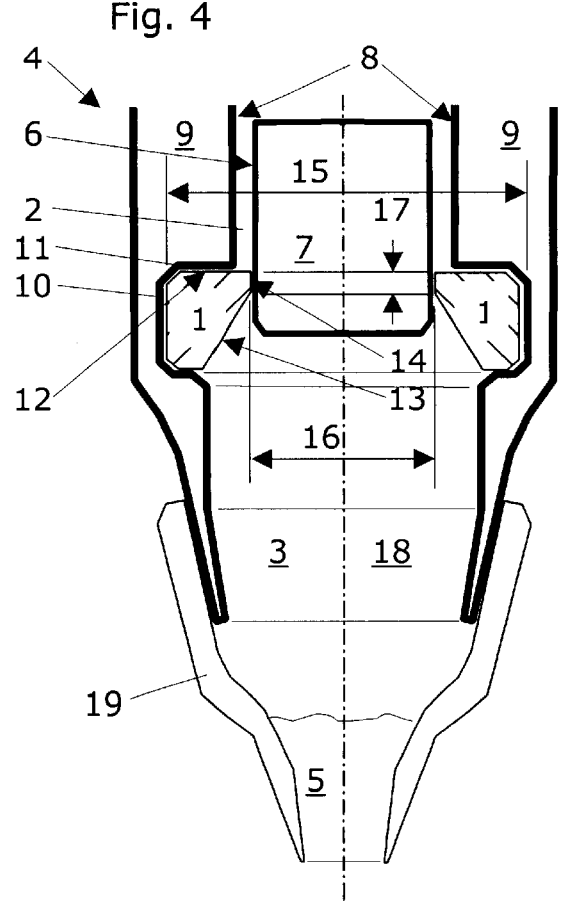
FIG. 4 represents a vertical partial section through a device for aspirating and/or dispensing fluids in accordance with a second exemplary embodiment, having a seal of a first variation installed.

FIG. 4 represents a vertical partial section through a device 4 for aspirating and/or dispensing fluids 5 in accordance with a second exemplary embodiment, having a seal of a first variation installed. The seal 1 is used for separating a first chamber 2 (air-filled) from a second chamber 3 (here filled with fluid and air) in a device 4 for aspirating and/or dispensing fluids 5. In this case the seal 1 is embodied to be ring-shaped and for acting on an outer surface 6 of a piston 7 of this device 4. The seal 1 has been inserted into an annular groove 10, which is located in the inner surface 8 of the cylinder 9. The seal 1 comprises a flat contact surface 12, embodied to rest against a flank 11 of the annular groove 10, a support area 13, freely projecting into the second chamber 3, and a cylindrical sealing face 14. The support area 13 is designed as a cone surface which linearly narrows against the cylindrical sealing face 14.

The volume of the air cushion 18 in the mouth of the device 4 and in the attached disposable tip 19 located between the sealing face 14 and the surface of the fluid 5 is not changed by any movements of the static seal 1, so that it constitutes a defined chamber which can only be varied by fluctuations of the pressure. This air cushion 18 is found in all pipette tips in which the fluid 5 does not fill the entire second chamber 3, regardless of whether these pipette tips have been attached to or integrated into the cylinder/piston mechanism. The seal 1 has an interior diameter, or sealing face cylinder diameter 16, which is slightly less than the diameter of the piston 7, or "plunger".

In such a single conduit system the contact surface 12 can practically have any arbitrary exterior diameter 15. In the case of a 96-conduit head, this diameter 15 preferably is less than 1 cm. In that case, the sealing face cylinder 14 has a diameter 16 of less than 5 mm and a height 17 of less than 2 mm. In the case of a 384-conduit head, this diameter 15 preferably is less than 5 mm. In that case the sealing face cylinder 14 preferably has a diameter 16 of less than 3 mm and a height 17 of less than 1 mm. These measurements considerably affect the frictional force between the seal 1 and the piston 7 (or between the seal 1 and the cylinder 9, see FIG. 2). A coefficient of friction of less than 3 N (Newton) per conduit is particularly preferred for multi-pipette heads with, for example, 96 or 384 conduits.

The seal for the 96-conduit heads is preferably given its final shape on a lathe. For seals for a 384-conduit head, however, it is particularly preferred to produce them in an injection mold because of the particular low, process-connected production tolerances.

EPDM (ethylene-propylene-diene monomer) caoutchouc has been proven to be a particularly suitable material for producing the seals in accordance with the invention, wherein the elasticity of this copolymer can be affected by means of the degree of cross linking. Elastomers in general are preferred for producing the seals in accordance with the invention. The use of harder materials, such as Teflon® (DuPont) is possible, however, in that case it is necessary to make particularly high demands on the tolerance measurements.

The surface roughness of the piston 7 quite considerably affects the sealing function of the seal 1 and its frictional resistance, as well as its service life. Pistons 7 of a diameter of less than 5 mm and a surface roughness of N5 at most, are preferred in devices 4 with a plurality of pistons 7 and cylinders 9 arranged parallel in respect to each other, in particular 96, 384 or 1536. A surface roughness of the piston surface 6 cooperating with the cylindrical sealing face 14 of N2 or N1 is particularly preferred. The N numbers relate to the surface roughness in accordance with Swiss standards.

VSM 1997, ISBM 3 909 750 08 7, which is incorporated herein by reference in its entirety, and wherein the Surface Roughness Conversion Table defines:

N5: 0.4 μm
N4: 0.2 μm
N3: 0.1 μm
N2: 0.05 μm
N1: 0.025 μm

Seals of a circular shape are preferred, but this invention of course also includes geometric shapes deviating from this shape, for example polygons, ovals and the like.

Like parts have been provided with like reference numerals in the drawings, here, the corresponding identifications are valid, even though they are not expressly listed in each case. Arbitrary combinations of the represented, or described, characteristics are parts of the present invention.

What is claimed is:

1. A seal for separating a first chamber from a second chamber in a device for dispensing liquids or for aspirating and dispensing liquids, the seal consisting of:
   a single ring-shaped body that is made of an elastomeric material, the body of the seal comprising:
   a flat contact surface that rests against a flank of an annular groove located in an outer piston surface or in an inner cylinder surface of said device for dispensing liquids or for aspirating and dispensing liquids,
   a support area freely projecting into said first or second chamber, and
   a cylindrical sealing face supported by the contact surface and the support area;
   wherein the cylindrical sealing face is adapted to act on either an outer surface of a piston or an inner surface of a cylinder of said device for dispensing liquids or for aspirating and dispensing liquids.

2. The seal in accordance with claim 1, wherein the support area is a cone surface, which narrows linearly or non-linearly against the cylindrical sealing face.

3. The seal in accordance with claim 1, wherein the contact surface has an outer diameter of less than 1 cm, and the sealing face has a diameter of less than 5 mm and a height of less than 2 mm.

4. The seal in accordance with claim 1, wherein the contact surface has an outer diameter of less than 5 mm and the sealing face has a diameter of less than 3 mm and a height of less than 1 mm.

5. The seal in accordance with claim 1, wherein a frictional force is present between the seal and the piston, or between the seal and the cylinder, said frictional force having a value of less than 5 Newtons.

6. The seal in accordance with claim 5, wherein said frictional force has a value of less than 3 Newtons.

7. The seal in accordance with claim 1 that is made of ethylene-propylene-diene monomer caoutchouc.

8. The device in accordance with claim 7, further comprising a piston positioned between the first and second chambers.

9. The device in accordance with claim 8, further comprising a multitude of pistons and cylinders, which are arranged essentially parallel with each other, the multitude being one of 96, 384, or 1536.

10. The device in accordance with claim 7, wherein the annular groove for receiving the seal is formed in an inner surface of a cylinder of the device, and the seal acts on an outer surface of the piston.

11. The device in accordance with claim 10, wherein the piston has a surface roughness of N2.

12. The device in accordance with claim 10, further comprising a multitude of pistons and cylinders, which are arranged essentially parallel with each other, the multitude being one of 96, 384, or 1536.

13. The device in accordance with claim 7, further comprising a multitude of pistons and cylinders, which are arranged essentially parallel with each other, the multitude being one of 96, 384, or 1536.

14. A device for dispensing liquids or for aspirating and dispensing liquids, having a first and second chamber, a seal for separating the two chambers and an annular groove for inserting the seal, wherein said device comprises at least one seal in accordance with one of claims 1 through 8.

15. The device in accordance with claim 14, further comprising a multitude of pistons and cylinders, which are arranged essentially parallel with each other, the multitude being one of 96, 384, or 1536.

16. The device in accordance with claim 14, wherein the piston has a surface roughness no greater than N5.

17. The device in accordance with claim 16, further comprising a multitude of pistons and cylinders, which are arranged essentially parallel with each other, the multitude being one of 96, 384, or 1536.

* * * * *